(12) United States Patent
Strayer

(10) Patent No.: US 9,969,491 B2
(45) Date of Patent: May 15, 2018

(54) DRONE LAUNCH SYSTEMS AND METHODS

(71) Applicant: THE BOEING COMPANY, Chicago, IL (US)

(72) Inventor: James David Strayer, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 14/843,329

(22) Filed: Sep. 2, 2015

(65) Prior Publication Data
US 2017/0057635 A1    Mar. 2, 2017

(51) Int. Cl.
*B64F 1/04* (2006.01)
*B64C 39/02* (2006.01)
*B64D 1/02* (2006.01)
*B64C 5/06* (2006.01)

(52) U.S. Cl.
CPC .............. *B64C 39/024* (2013.01); *B64C 5/06* (2013.01); *B64D 1/02* (2013.01); *B64C 2201/08* (2013.01); *B64C 2201/18* (2013.01)

(58) Field of Classification Search
CPC .......... B64C 2201/08; B64C 2201/088; B64C 2201/165; B64C 39/024; B64C 2201/201; B64C 2201/205; F41F 3/07; F41F 1/04
See application file for complete search history.

(56) References Cited

U.S. PATENT DOCUMENTS

| | | | | |
|---|---|---|---|---|
| 4,296,894 A * | 10/1981 | Schnabele | ............... | F42B 10/14 244/3.1 |
| 4,410,151 A * | 10/1983 | Hoppner | ............... | B64C 39/024 244/120 |
| 4,844,380 A * | 7/1989 | Peoples | .................. | B64G 1/002 244/3.22 |
| 5,118,052 A * | 6/1992 | Alvarez Calderon F | . | B64C 1/30 244/120 |
| 8,292,215 B2 | 10/2012 | Olm | | |
| 8,492,692 B2 * | 7/2013 | Fisher | .................. | B64C 39/024 244/13 |
| 8,505,430 B2 * | 8/2013 | Miralles | ................ | B64C 39/024 89/1.815 |
| 8,662,441 B2 * | 3/2014 | Powell | .................. | B64C 39/024 244/62 |
| 8,989,922 B2 | 3/2015 | Jones | | |
| 9,187,184 B2 * | 11/2015 | Miralles | ................ | B64C 39/024 |
| 9,470,477 B2 * | 10/2016 | Su | ......... | B64C 39/024 |
| 9,612,085 B2 * | 4/2017 | Powell | ...... | F41F 3/07 |
| 2011/0315817 A1 * | 12/2011 | Miralles | ............... | B64C 39/024 244/63 |
| 2012/0001020 A1 * | 1/2012 | Miralles | ............... | B64C 39/024 244/63 |

(Continued)

*Primary Examiner* — Philip J Bonzell
(74) *Attorney, Agent, or Firm* — Joseph M. Butscher; The Small Patent Law Group, LLC

(57) ABSTRACT

A drone launch system includes a canister defining an internal cavity, and a drone positioned within the internal cavity in a stowed state. The drone is configured to be ejected from the canister and transition from the stowed state into a deployed state outside of the canister. A method for launching a drone, the method includes positioning the drone in a stowed state in an internal cavity of a canister, ejecting the drone from the canister, and transitioning the drone into a deployed state after the ejecting operation.

23 Claims, 7 Drawing Sheets

(56) References Cited

U.S. PATENT DOCUMENTS

| | | | |
|---|---|---|---|
| 2012/0138727 A1* | 6/2012 | Fisher | B64C 39/024 244/3.15 |
| 2015/0008280 A1* | 1/2015 | Smoker | B63G 8/001 244/63 |
| 2015/0175276 A1 | 6/2015 | Koster | |
| 2015/0259066 A1* | 9/2015 | Johannesson | B64C 27/08 244/17.27 |
| 2015/0266578 A1* | 9/2015 | Elkins | B64C 39/024 244/137.1 |
| 2015/0267996 A1* | 9/2015 | Su | B64C 39/024 89/1.816 |
| 2016/0039536 A1* | 2/2016 | Miralles | B64C 39/024 244/63 |
| 2016/0178317 A1* | 6/2016 | Powell | F41F 3/07 89/1.81 |
| 2016/0347476 A1* | 12/2016 | Andryukov | B64C 39/024 |

\* cited by examiner

DRONE LAUNCH SYSTEMS AND METHODS

FIELD OF THE DISCLOSURE

Embodiments of the present disclosure generally relate to systems and methods for launching unmanned aerial vehicles (UAVs), such as drones.

BACKGROUND OF THE DISCLOSURE

Unmanned aerial vehicles (UAVs), such as drones, are used in a wide variety of applications. For example, in military applications, drones may be deployed to monitor various locations, deliver ordnance on a target, and/or the like. Drones may be deployed from various platforms, such as on land or sea. For example, a drone may be deployed from a base on land, or from a deck of a ship on a body of water.

Typically, a drone includes one or more propulsion systems, such as one or more motors having propeller blades attached thereto. Each propulsion system extends outwardly from a main housing of the drone. As such, a drone may define an outer axial cross-section that includes the main housing and one or more propulsion systems extending from the main body.

Due to their size, however, drones may occupy relatively large amounts of space within a confined area. For example, extended arms having propulsion systems may provide a relatively large axial envelope for each drone. The size, shape, and somewhat delicate nature (such as propellers) of drones often make assembly processes and transport (for example, shipping) between locations awkward and time-consuming. Accordingly, a need exists for a more efficient system and method of storing and deploying drones.

SUMMARY OF THE DISCLOSURE

Certain embodiments of the present disclosure provide a drone launch system that may include a canister defining an internal cavity, and a drone positioned within the internal cavity in a stowed state (for example, collapsed, folded, compact, or other such state that reduces an overall size of the drone). The drone is configured to be ejected from the canister and transition from the stowed state into a deployed state outside of the canister. For example, the drone may be launched, sprung, dropped, or otherwise ejected from the canister.

The drone may include a main housing and at least one arm having at least one propulsion system. The arm(s) is folded into a collapsed position in the stowed state, and extends outwardly from the main housing in the deployed state. The arm(s) may include a fixed beam that connects to an extension beam through a hinge. The extension beam may be rearwardly folded in the stowed state. The extension beam may swing about the hinge into an extended position in the deployed state.

The drone may include at least one connection member that is configured to connect to and restrain the extension beam in the stowed state. The connection member may be configured to release the extension beam as the drone transitions from the stowed state to the deployed state.

The propulsion system(s) may include at least one propeller (for example, a rotor having one or more propeller blades) operatively connected to at least one motor. In at least one other embodiment, the propulsion system(s) may include a rocket or jet system, for example.

The drone launch system may also include a launch vehicle secured to the drone within the internal cavity of the canister. The launch vehicle may include a plurality of fins. The canister may include a plurality of fin guides that retain the plurality of fins when the launch vehicle is stowed within the canister. The launch vehicle may include at least one blade holder configured to restrain at least a portion of a propulsion system of the drone in the stowed position.

The launch vehicle may be configured to activate to eject the launch vehicle and the drone from the internal cavity in response to detection of a condition of the drone launch system. In at least one embodiment, the launch vehicle may include a control unit that is configured to control operation of the launch vehicle. The launch vehicle may include at least one sensor that is configured to detect the condition. The condition may be, for example, an altitude, an acceleration, a velocity, a position relative to sea level, or a time from a launch of the canister and/or the drone. In at least one other embodiment, the condition may be a received activation command from a remote control.

The drone separates from the launch vehicle and transitions to the deployed state in response to detection of a condition of the drone. The drone may include at least one sensor configured to detect the condition. The condition may be, for example, an altitude, an acceleration, a velocity, a position relative to sea level, or a time from a launch of the launch vehicle and the drone from the canister. In at least on other embodiment, the condition may be a received activation command from a remote control.

The canister may be water-tight in a closed position in which the drone is stowed within the internal cavity. The canister may be buoyant and configured to float on a surface of water when the drone is in the stowed state within the internal cavity.

The drone may include a control unit that is configured to control operation of the drone. The drone may include at least one deployable landing leg. The deployable landing leg(s) extends into a deployed position as the drone transitions from the stowed state to the deployed state.

Certain embodiments of the present disclosure provide a method for launching a drone. The method may include positioning the drone in a stowed state in an internal cavity of a canister, ejecting the drone from the canister, and transitioning the drone into a deployed state after the ejecting operation. The method may include folding at least one arm of the drone into a collapsed position in the stowed state. The transitioning operation may include outwardly extending the arm(s) from a main housing of the drone.

The method may also include securing a launch vehicle to the drone within the internal cavity in the stowed state. The ejecting operation may include activating the launch vehicle to eject the launch vehicle and the drone from the internal cavity in response to detection of a condition of the drone launch system.

The method may also include separating the drone from the launch vehicle and transitioning the drone to the deployed state in response to detection of a condition of the drone. The transitioning operation may include deploying at least one landing leg of the drone.

DETAILED DESCRIPTION OF THE DISCLOSURE

Figure 1:
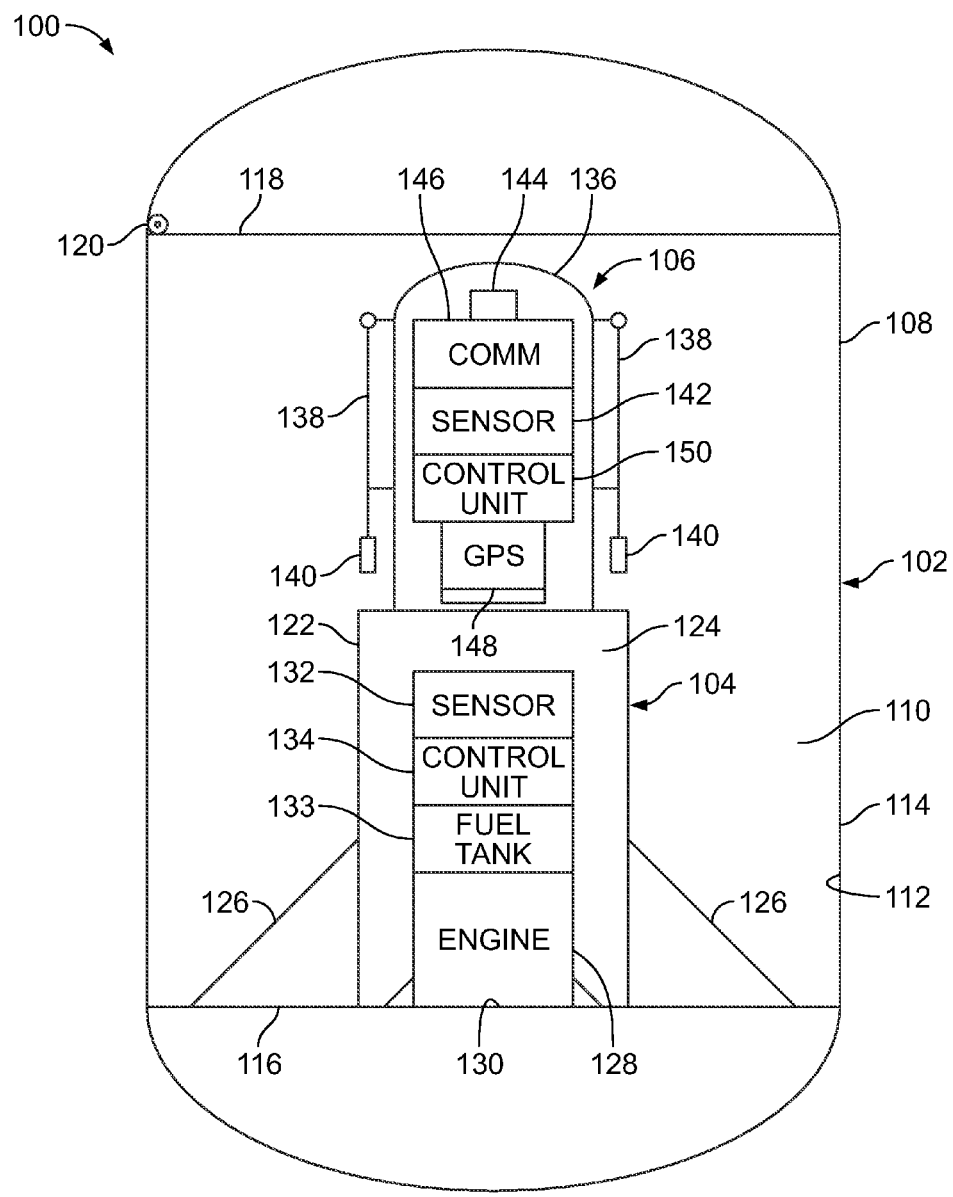
FIG. 1 illustrates a simplified schematic diagram of a drone launch system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a drone launch system that may include a canister for storing and transporting a drone that is arranged in a stowed condition, such as a folded state. The drone launch system may also include a drone that is positioned in an initial stowed condition when not in use, and transforms to a deployed condition after being launched or otherwise ejected from the canister. The drone launch system may include a launch vehicle (similar to a rocket) that separates from the drone at a predetermined altitude. The drone may also include foldable arms that allow the drone to be collapsed and stored in the stowed position.

The canister may be cylindrically shaped and defines a cavity therein. The canister may include one or more rails, tracks, or other such guides that are configured to guide the launch vehicle and/or the drone as it transitions from the stowed state to a deployed state. In at least one embodiment, the canister may be water-tight to enable the drone to be launched underwater, such as from a submarine or an unmanned underwater vehicle. For example, the canister may have an internal pressure sensor, ballast, or the like, such that when the canister is launched from the submarine, the canister floats to the surface. Once at the surface, the lid may open, or the thrust force exerted by the launch vehicle may force the lid open and the drone and the launch vehicle may eject from the canister. The launch vehicle propels the drone to a certain altitude at which the launch vehicle separates from the drone. As (or before) the launch vehicle separates from the drone, arms of the drone may outwardly extend or otherwise expand. Motor driven propellers on the arms then activate and the drone may be deployed on a mission.

The drone may be preprogrammed or operated remotely by a user. For example, the drone may include a global positioning system (GPS) to enable the drone to be self-guided, or have a communication device, such as an antenna and/or other systems to enable the drone to be controlled remotely.

Certain embodiments of the present disclosure provide a drone launch system that includes a canister having a cavity defined therein, and an unmanned automated vehicle (UAV) (such as a drone) configured to be stored within the canister. The UAV is configured to be in a stowed state while housed within the canister, and in a deployed state when ejected from the canister. The system may also include a launch vehicle configured to eject the UAV from the canister and detach from the UAV when outside of the canister. The UAV has a plurality of arms stowable in a first position prior to being deployed and extendable to an operating position after being deployed. In at least one embodiment, each of the arms includes a motor and a rotor (including at least one propeller) coupled to the motor. The arms may be temporarily coupled to the launch vehicle in the stowed state. The UAV may also include a landing device.

The canister may be water-tight. The canister may be buoyant and configured to float on a surface of a body of water. For example, the canister may include a flotation device, such as an air bladder, foam floats, a ballast, and/or the like. In at least one other embodiment, the canister may be operatively coupled to an elevating device, such as one or more elevators, stanchions, and/or the like, that may be configured to elevate the canister from a position below a surface of the water to a position at or above the surface of the water.

FIG. 1 illustrates a simplified schematic diagram of a drone launch system 100, according to an embodiment of the present disclosure. The drone launch system 100 includes a canister 102 that houses a launch vehicle 104 and a drone 106 in a stowed state. It is to be understood that the canister 102, the launch vehicle 104, and drone 106 are not drawn to scale in FIG. 1.

The canister 102 may include a generally cylindrical tubular main body 108 defining an internal cavity 110 between internal surfaces 112 of the outer wall 114, a support base 116, and a cover 118, such as a cap or lid. Alternatively, the canister 102 may be formed in various other shapes or sizes, such as a rectangular box, sleeve, or the like. A pivot member 120, such as a hinge, may be configured to allow the cover 118 to be pivoted between closed and open positions. In at least one other embodiment, the canister 102 may not include the pivot member 120. Instead, the cover 118 may be removably secured to the main body 108 such as through a press fit, an interference fit, and/or the like. The cover 118 may be configured to separate from the main body 108 upon exertion of a defined force, such as when the launch vehicle 104 urges the drone 106 into the cover 118. In at least one other embodiment, the canister 102 may not include the cover 118. Instead, the canister 102 may include an open end through which the drone 106 is exposed. In at least one other embodiment, instead of a cover, the canister 102 may include a thin membrane (such as formed of plastic, cardboard, an elastomeric material, and/or the like) that may be punctured by a propelled drone 106 and launch vehicle 104.

As shown, the canister 102 stores the launch vehicle 104 and the drone 106 within the internal cavity 110. While stored within the canister 102, the drone 106 is in a stowed state. While closed, the canister 102 may be water-tight. For example, the connection between the main body 108 and the cover 118 may include a water-tight seal.

The launch vehicle 104 may include a fuselage 122 defining an internal chamber 124 and one or more guide fins 126 extending outwardly from the fuselage 122. An engine 128 is secured within the internal chamber 124 and may include an exhaust outlet 130 that allows exhaust gas or gasses to pass out of the fuselage 122. The engine 128 may be operatively coupled to a fuel tank 133, which stores fuel (such as gasoline, jet fuel, or the like) that is configured to be used by the engine 128 to launch the launch vehicle 104 and the drone 106 out of the canister 102. The engine 128 may be embodied as a turbofan engine, a ramjet, an internal combustion engine, or an electric engine (in which case, instead of a fuel tank, the launch vehicle 104 may include one or more batteries coupled to the engine 128), and/or the like. The launch vehicle 104 may provide a rocket-based launch vehicle. In at least one other embodiment, the engine 130 may be coupled to a rotor having a propeller that is configured to propel the launch vehicle 104. In at least one other embodiment, the engine 128 and fuel tank 133 may be or include an air canister that is configured to be activated to launch from the canister 102 via exerted air pressure.

The launch vehicle 104 may also include a deployment sensor 132 (for example, a launch vehicle sensor) that is configured to detect a condition at which the launch vehicle 104 is to activate to deploy from the canister 102. The deployment sensor 132 may include one or more of an accelerometer, an altimeter, a timer, or the like.

For example, an accelerometer of the deployment sensor 132 may detect a predetermined acceleration of the drone launch system 100 at which the launch vehicle 104 is to activate. In at least one embodiment, the drone launch system 100 may be fired from a cannon, gun, or the like. When the accelerometer detects a particular acceleration (or a change in acceleration), the launch vehicle 104 may activate, such as by activating the engine 128 to launch the drone 106 out of the canister 102. As another example, an altimeter of the deployment sensor 132 may detect a predetermined altitude of the drone launch system 100 at which the launch vehicle 104 is to activate. As another example, a timer of the deployment sensor 132 may detect a predetermined time from when the drone launch system 100 is launched from a vehicle, cannon, gun, or the like, or otherwise deployed (such as being dropped from a bay of an aircraft) at which the launch vehicle 104 is to activate. In yet another embodiment, the deployment sensor 132 may include a communication device (such as an antenna) that receives an activation signal or command from a remote site (such as a base) that detects a deployment signal.

The launch vehicle 104 may also include a control unit 134 that is operatively coupled to the deployment sensor 132 and the engine 128. The control unit 134 controls operation of the launch vehicle 104. For example, the control unit 134 may store activation parameters, such as a predetermined altitude, acceleration, time from launch, and/or the like. The control unit 134 may be in communication with the deployment sensor 132 and activates the engine 128 based on a detected deployment signal received from the deployment sensor 132. For example, when the control unit 134 detects a signal from the deployment sensor 132 that matches or exceeds a stored activation parameter, the control unit 134 activates the engine 128, which then launches the launch vehicle 104 and the drone 106 out of the canister 102.

In at least one embodiment, the launch vehicle 104 may not include a separate and distinct control unit 134. Instead, the deployment sensor 132 may be coupled to the engine 128 and configured to activate the engine 128, in response to a triggering sensed condition.

The drone 106 may include a main housing 136 having one or more collapsible arms 138 extending therefrom. In the stowed state, the arms 138 are folded into a collapsed state such that distal ends having propulsion systems 140 are proximate to the main housing 136.

The drone 106 may also include a deployment sensor 142 (for example, a drone sensor), similar to the deployment sensor 132 of the launch vehicle 104. The deployment sensor 142 is configured to detect one or more conditions (such as altitude, acceleration, velocity, time, and/or the like) that are used to transition the drone 106 into a deployed state (such as by the arms 138 fully extending).

The drone 106 may also include a power source 144, such as a battery, internal combustion engine, and/or the like, that is configured to provide power to operate the drone 106. The drone 106 may also include a communication device 146, such as an antenna, that is configured to communicate with a remote control, which may be used to control the drone 106, such as through one or more commands. Alternatively, the drone 106 may not include the communication device 146.

The drone 106 may also include a global positioning system (GPS) 148 that is configured to detect a current global position of the drone 106. In this manner, the drone 106 may be automatically operated without the need for a remote control. Alternatively, the drone 106 may not include the GPS 148.

The drone 106 may also include a control unit 150 that may be configured to control operation of the drone 106, in a similar manner as the control unit 134, which may control the launch vehicle 104. For example, the control unit 150 may be operatively coupled to the deployment sensor 142, the communication device 146, and/or the GPS 148 in order to determine when to deploy the drone 106 (such as by separating from the launch vehicle 104), and fly the drone to and from particular locations. Alternatively, the drone 106 may not include the control unit 150, but instead may deploy based on one or more conditions detected by the deployment sensor 142, and operated through the GPS 148, and/or the communication device 146.

In at least one embodiment, the control unit 150 may be configured to control operation of both the launch vehicle 104 and the drone 106. Accordingly, the launch vehicle 104 may not include a separate and distinct control unit.

As shown, the drone 106 and the launch vehicle 104 may be compactly stored within the internal cavity 110 of the canister 102. The canister 102 may be launched, ejected, or otherwise deployed from a particular platform (such as an aircraft, watercraft, land-based vehicle, stationary base, and/or the like). When the canister 102 reaches a predetermined condition or condition (such as an altitude, acceleration, speed, position in relation to sea level, time from deployment, or the like), the launch vehicle 104 activates. As the launch vehicle 104 activates, the thrust from the engine 128 launches the launch vehicle 104 and the drone 106 from the canister 102. For example, as the launch vehicle 104 forces the drone 106 into the cover 118, the force exerted by the drone 106 may separate the cover 118 from the main body 108 of the canister 102, and the launch vehicle 104 and the drone 106 move (such as by being launched) out of the canister 102.

As the launch vehicle 104 reaches a predetermined condition (such as a predetermined altitude, acceleration, or the like), the arms 138 of the drone 106 extend into a deployed state, and the propulsion systems 140 are activated. For example, the fuel tank 133 may contain a particular amount of fuel that propels the launch vehicle 104 to a particular altitude. When the fuel is fully expended, the launch vehicle 104 decelerates (as there is no more fuel to propel the launch vehicle). The deployment sensor 142 senses the deceleration. The control unit 150 receives the signal from the deployment sensor 142 and transitions the drone 106 into the deployed state, at which point the drone 106 separates from the launch vehicle 104, and the launch vehicle 104 then falls back to Earth. In at least one embodiment, the activation of the propulsion systems 140 may provide sufficient force to separate the drone 106 from the launch vehicle 104. In at least one other embodiment, as the drone 106 transitions to the deployed state, the control unit 150 may disengage connecting devices (such as latches, clasps, or the like) that connect the launch vehicle 104 to the drone 106, thereby separating the drone 106 from the launch vehicle 104.

As described above, the control unit 134 may be used to control operation of the launch vehicle 104, while the control unit 150 may be used to control operation of the drone 106. As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, each of the control units 134 and 150 may be or include one or more processors that are configured to control operation of the launch vehicle 104 and the drone 106, respectively.

Each of the control units 134 and 150, for example, is configured to execute a set of instructions that are stored in one or more storage elements (such as one or more memories), in order to process data. For example, each of the control units 134 and 150 may include or be coupled to one or more memories. The storage elements may also store data or other information as desired or needed. The storage elements may be in the form of an information source or a physical memory element within a processing machine.

The set of instructions may include various commands that instruct the control units 134 and 150 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control units 134 and 150 shown in FIG. 1. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units 134 and 150 may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
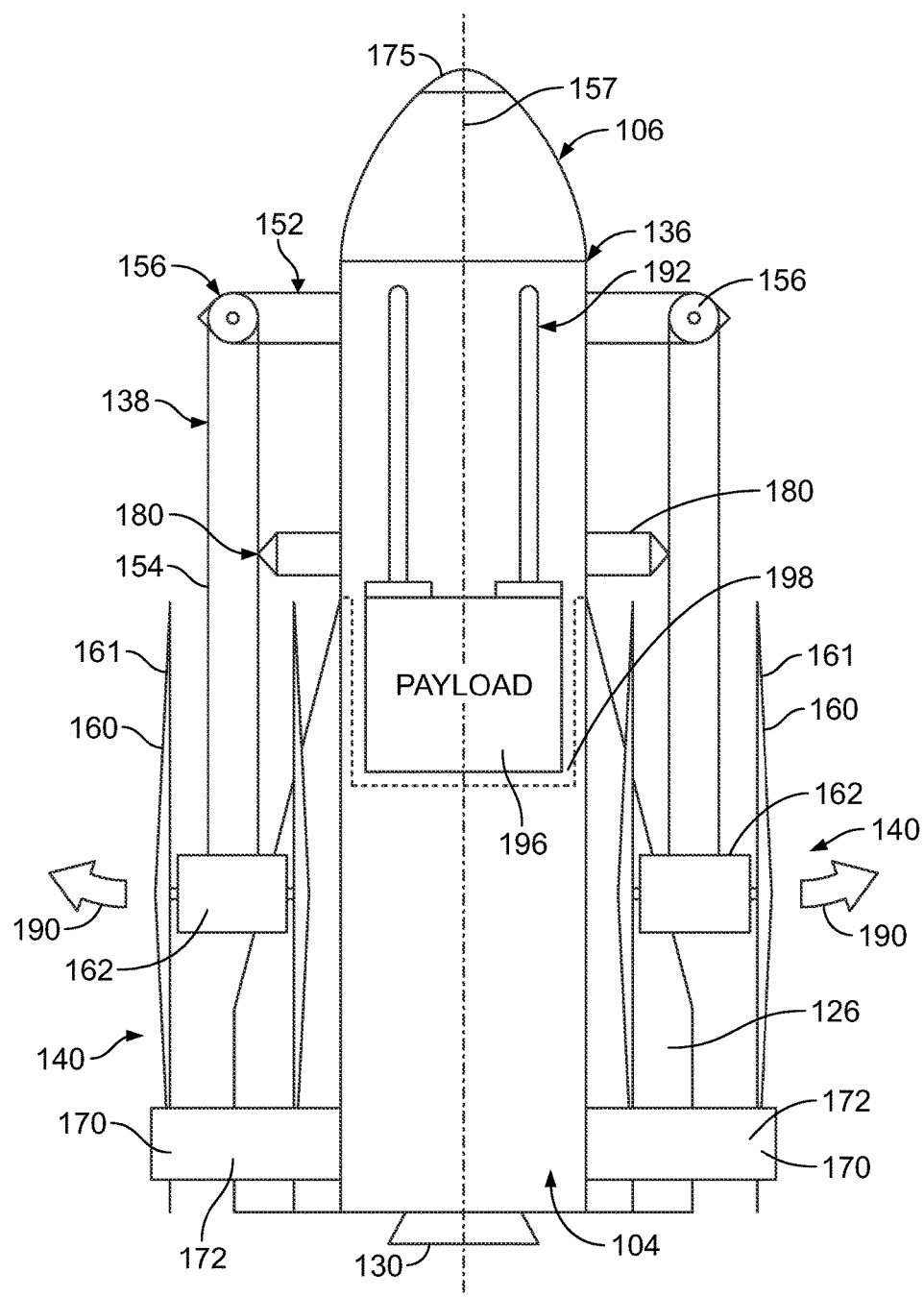
FIG. 2 illustrates a lateral view of a drone connected to a launch vehicle, according to an embodiment of the present disclosure.

FIG. 2 illustrates a lateral view of the drone 106 connected to the launch vehicle 104, according to an embodiment of the present disclosure. Each of the arms 138 of the drone 106 may include a fixed beam 152 that connects to an extension beam 154 through a hinge 156. In the stowed state, the extension beams 154 are rearwardly folded such that they may be parallel to a central longitudinal axis 157 of the drone 106. As shown, propulsion systems 140 connect to the extension beams 154. The propulsion systems 140 may include one or more rotors 160 (which include propeller blades 161) operatively connected to a motor 162.

Blade holders 170 may outwardly extend from the launch vehicle 104. Each blade holder 170 may include opposed panels 172 separated by a gap (hidden from view in FIG. 2). Each blade holder 170 is configured to hold, retain, or otherwise restrain the rotors 160 (such as within a gap between opposed panels 172) of a respective propulsion system 140 of the drone 106 while the drone 106 is in the stowed state. In this manner, the blade holders 170 restrain the rotors 160 when the drone 106 is in the stowed state, thereby protecting the rotors 160 from damage. Alternatively, the launch vehicle 104 may not include the blade holders 170.

Each extension beam 154 may be secured to the main housing 136 through a connection member 180, such as a latch, clasp, magnet, post, bayonet, and/or the like. The connection member 180 is configured to maintain the extension beam 154 in the rearwardly folded position when the drone 106 is in the stowed position. As the drone 106 is transitioned to a deployed state, the extension beams 154 detach from the connection members 180 (such as by the force exerted by the activated propulsion systems 140 and/or the control unit 150 (shown in FIG. 1) retracting or otherwise releasing the connection members 180), and the extension beams 154 outwardly swing open in the direction of arcs 190 about pivot axles of the hinges 156. As the extension beams 154 swing open, the rotors 160 release from and/or slide past the blade holders 170. The extension beams 154 continue to swing open in the direction of arcs 190 about the pivot axles of the hinges 156 until the extension beams 154 form a straight line with the fixed beams 152, at which point the extension beams 154 may lock into position with respect to the fixed beams 152. Alternatively, the extension beams 154 and/or other portions of the arms 138 may be operatively connected to one or more motors (such as geared motors) that are configured to move the arms 138 between deployed and stowed positions.

The drone 106 may include one or more deployable landing legs 192 moveably secured to the main housing 136. The landing legs 192 may be moved between a stowed position and a deployed position as the drone 106 transitions from the stowed state to the deployed state.

Additionally, the drone 106 may include a payload 196. In the stowed state, the payload 196 may be housed within an internal chamber 198 of the launch vehicle 104. In this manner, the launch vehicle 104 may protect the payload 196 from damage, such as may be caused by movement and/or thrust of the launch vehicle 104. The payload 196 may include one or more of a camera, ordnance (such as a bomb), a weapon (such as a moveable gun), a radar system, an item to be delivered to a location (such as medicine to be delivered on a humanitarian mission), and/or the like.

The drone 106 may include a total of four arms 138 that are regularly spaced about the main housing 136. Optionally, the drone 106 may include more or less than four arms. Further, each arm 138 may include a propulsion system 140 having two aligned rotors 160. Optionally, the propulsion system 140 may include more or less rotors 160. In at least one other embodiment, the propulsion systems 140 may not be propeller based. For example, the propulsion systems 140 may include jet or rocket propulsion systems.

As shown in FIG. 2, the main housing 136 of the drone 106 may include a tapered nose 175. As such, when connected to the launch vehicle 104, the drone 106 forms an aerodynamically stable structure with the launch vehicle 104. For example, the nose 175 may be sized and shaped to minimize or otherwise reduce turbulence and drag. The fins 126 provide additional aerodynamic stability as the launch vehicle 104 launches the drone 106 from the canister 102 (shown in FIG. 1).

Alternatively, the arms 138 may be configured to move between stowed and deployed states through various structures other than folding segments. For example, the arms 138 may include one or more sliding rails, tracks, or the like that are configured to allow portions to inwardly slide toward the main housing 136 into a retracted position, and outwardly slide out of the main housing 136 into an extended position. In at least one other embodiment, the arms 138 may include telescoping beams that are configured to telescope in and out between stowed and deployed positions. As another example, the arms 138 may include arcuate beams that are configured to radially retract and expand between stowed and deployed states.

Figure 3:
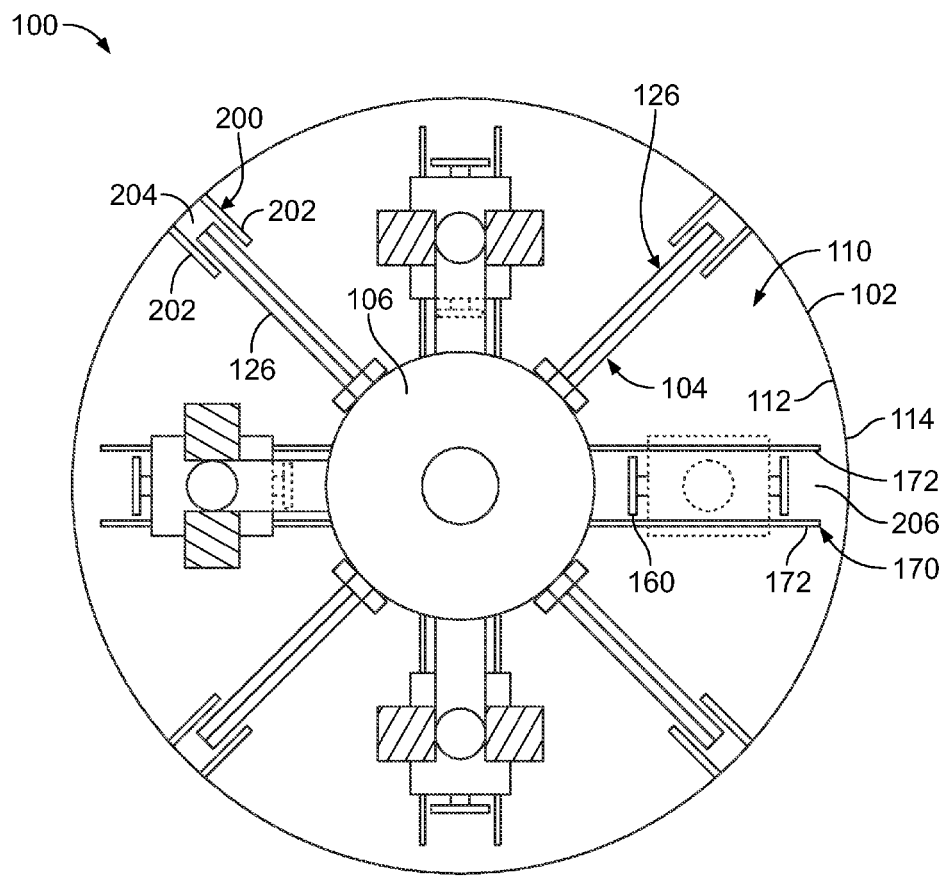
FIG. 3 illustrates a top end view of a drone launch system, according to an embodiment of the present disclosure.

FIG. 3 illustrates a top end view of the drone launch system 100, according to an embodiment of the present disclosure. For the sake of clarity, the cover 118 (shown in FIG. 1) of the canister 102 is not shown in FIG. 1. Fin guides 200 may inwardly extend from the internal surfaces 112 of the outer wall 114 of the canister 102. The number of fin guides 200 may equal the number of fins 126 of the launch vehicle 104. Each fin guide 200 may include parallel opposed panels 202 separated by a gap 204. A respective fin 126 of the launch vehicle 104 is positioned within the gap 204. As such, the fin guides 200 retain the launch vehicle 104 in a secure position before launch, and are configured to guide the fins 126 in an upright position (in relation to the canister 102) as the launch vehicle 104 is launched from the canister 102. Alternatively, the canister 102 may not include the fin guides 200.

Additionally, as shown, each blade holder 170 may include parallel opposed panels 172 extending from the launch vehicle 104. The opposed panels 172 are separated by a gap 206 in which the rotors 160 may be securely retained in the stowed position. Alternatively, the blade holders 170 may extend from the internal surfaces 112 of the outer wall 114. In at least one other embodiment, the drone launch system 100 may not include the blade holders 170. In at least one other embodiment, the blade holders 170 may be clips, such as breakable clips that break when the rotors 140 are activated.

As shown in FIG. 3, in the stowed position, the drone 106 and the launch vehicle 104 are stowed and secured within the internal cavity 110 of the canister 102. Optionally, one or more portions of the drone 106 and/or the launch vehicle 104 may extend outwardly from the canister 102. For example, a nose of the drone 106 may extend upwardly and outwardly from a top end of the canister 102.

Figure 4:
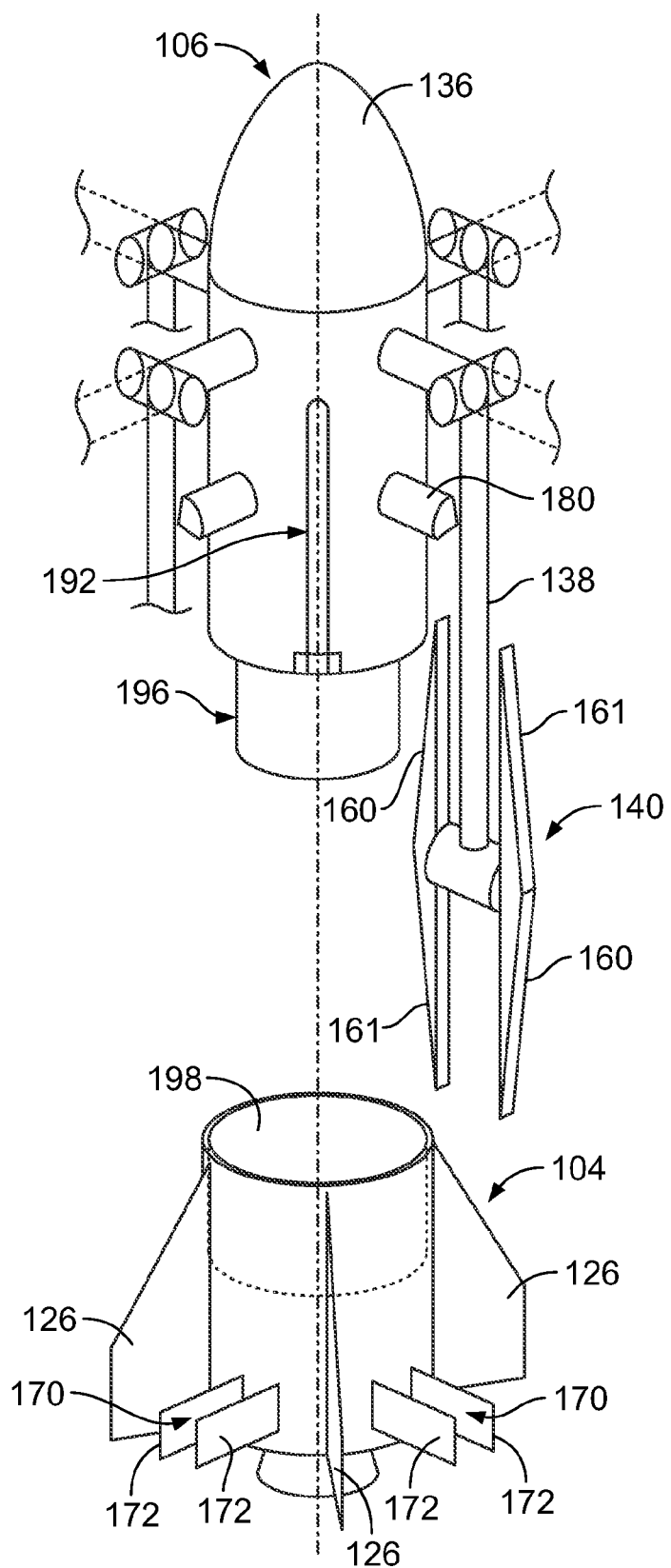
FIG. 4 illustrates a perspective view of a drone separating from a launch vehicle, according to an embodiment of the present disclosure.

FIG. 4 illustrates a perspective view of the drone separating from the launch vehicle 104, according to an embodiment of the present disclosure. As described above, after the launch vehicle 104 launches the drone 106 out of the canister 102 (shown in FIGS. 1 and 3), the drone 106 separates from the launch vehicle 104 in response to one or more predetermined detected conditions, such as a predetermined altitude, acceleration (whether positive or negative), velocity (whether positive or negative), time from launch from the canister 102, temperature, and/or the like. In at least one embodiment, one or more ejection springs may be disposed between the drone 106 and the launch vehicle 104. The ejection springs may facilitate efficient separation of the drone 106 from the launch vehicle 104. As the drone 106 separates from the launch vehicle 104 and transitions to a deployed state, the arms 138 outwardly extend as described above, and the propulsion systems 140 activate to allow the drone 106 to fly on its own. In the deployed state, the landing legs 192 may downwardly extend. Alternatively, the drone 106 may not include landing gear.

In the deployed state, the drone 106 may operate according to a mission plan. For example, the drone 106 may fly to a particular location and utilize the payload 196.

After the launch vehicle 104 separates from the drone 106, the launch vehicle 104 may run out of fuel. As such, the launch vehicle 104 may fall back to Earth. In at least one other embodiment, the launch vehicle 104 may include a parachute that deploys as the drone 106 separates from the launch vehicle 104. The parachute may be used to provide a soft landing.

Figure 5:
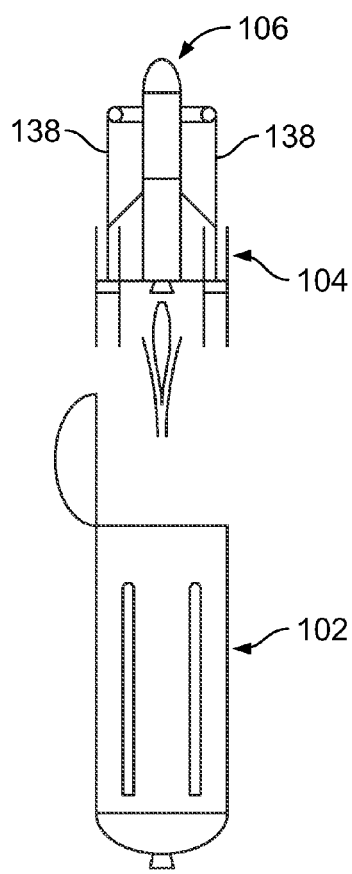
FIG. 5 illustrates a lateral view of a launch vehicle launching a drone from a canister, according to an embodiment of the present disclosure.

FIG. 5 illustrates a lateral view of the launch vehicle 104 launching the drone 106 from the canister 102, according to an embodiment of the present disclosure. As the launch vehicle 104 reaches one or more conditions (such as a predetermined altitude, position relative to sea level, time from ejection or launch of the canister, and/or the like), the engine 128 (shown in FIG. 1) of the launch vehicle 104 is activated, thereby forcing the drone 106 that is connected to the launch vehicle 104 out of the canister 102. The arms 138 remain in the stowed state in order to provide an aerodynamically efficient structure.

Figure 6:
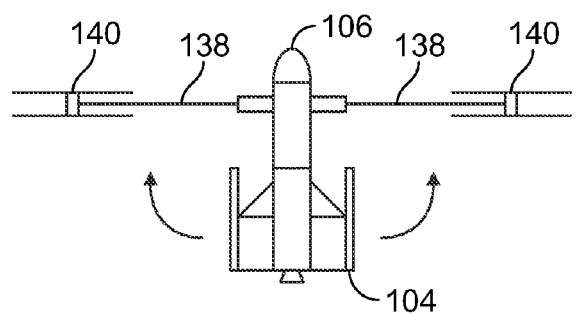
FIG. 6 illustrates a lateral view of a drone transitioning to a deployed state, according to an embodiment of the present disclosure.

FIG. 6 illustrates a lateral view of the drone 106 transitioning to the deployed state, according to an embodiment of the present disclosure. As the drone 106 senses a predetermined condition (such as a predetermined altitude, acceleration, velocity, time from launch, and/or the like), the arms 138 fully extend into a deployed state, as described above. The propulsion systems 140 may then activate to allow the drone 106 to fly on its own.

Figure 7:
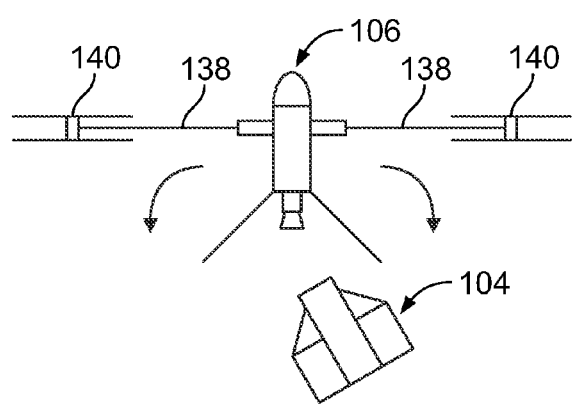
FIG. 7 illustrates a lateral view of a launch vehicle separating from a drone, according to an embodiment of the present disclosure.

FIG. 7 illustrates a lateral view of the launch vehicle 104 separating from a drone, according to an embodiment of the present disclosure. As the launch vehicle 104 runs out of fuel, the launch vehicle 104 separates from the drone 106 and falls back to Earth. The drone 106 then flies to and from locations according to a mission plan.

Figure 8:
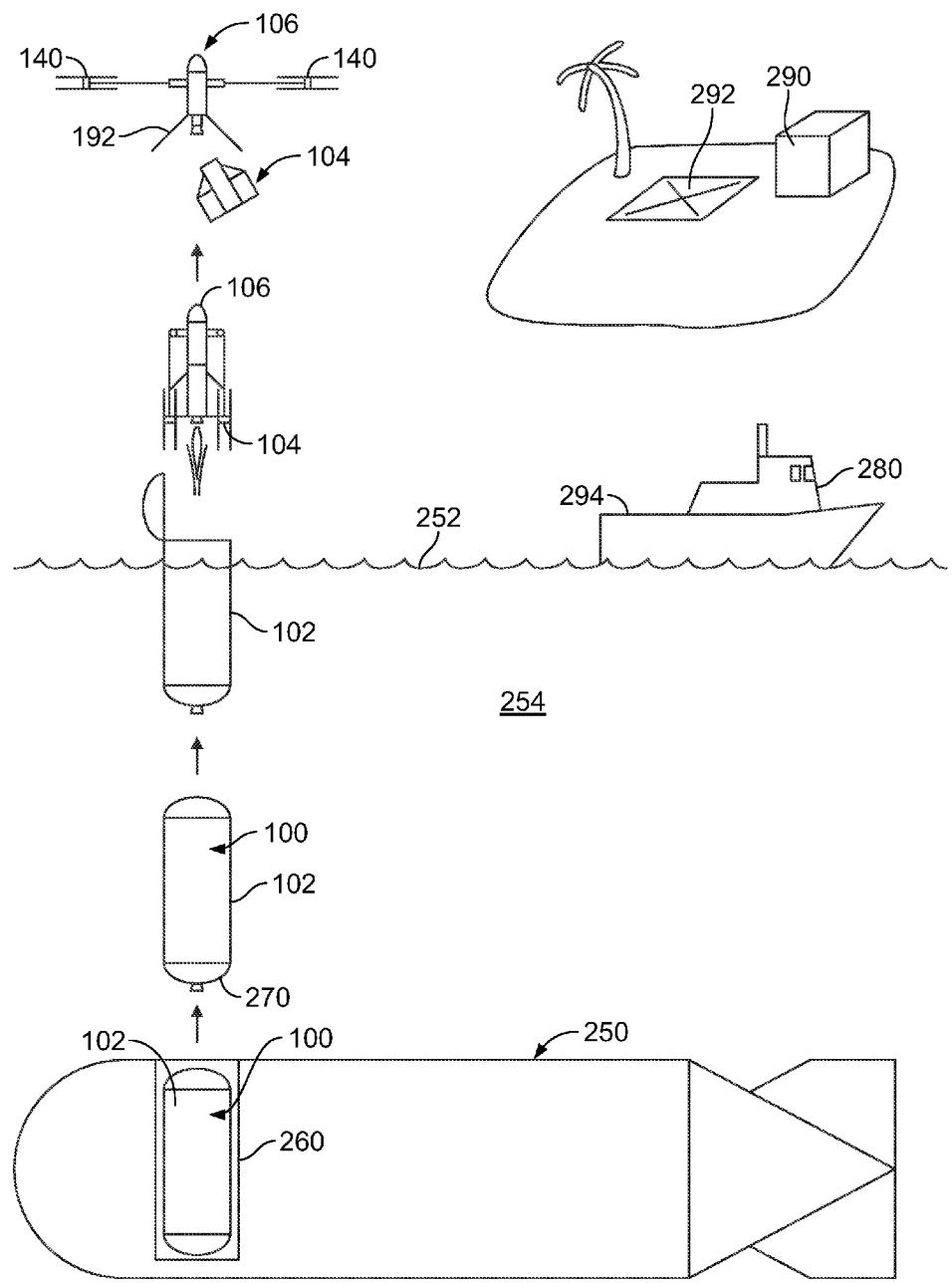
FIG. 8 illustrates a simplified schematic representation of a drone launch system being deployed from a submarine, according to an embodiment of the present disclosure.

FIG. 8 illustrates a simplified schematic representation of the drone launch system 100 being deployed from a submarine 250, according to an embodiment of the present disclosure. The submarine 250 is an example of a platform from which the drone launch system 100 may be deployed. The submarine 250 may operate underneath a surface 252 of a body of water 254. The submarine 250 may include a deployment port 260, such as a gun on deck, a torpedo chute, or simply a chute or other opening that may be opened to the water 254.

In operation, the deployment port 260 ejects or otherwise deploys the drone launch system 100. For example, the deployment port 260 may be opened, at which point a buoyancy of the canister 102 (which may provide a watertight construction in a closed position) may cause the drone launch system 100 to rise to the surface 252. For example, the canister 270 may include a flotation device 270, such as a ballast, an inflatable bladder, one or more buoyant foam inserts, a float ring around a portion of the canister 102, and/or the like. The canister 102 floats on the surface 252.

The launch vehicle 104 may detect a condition, such as a position at or above sea level, and/or a detected launch signal from a ship 280 and/or a base 290. In response to detecting the condition, the launch vehicle 104 is launched, along with the drone 106, out of the canister 102, as described above. For example, the launch vehicle 104 may include a sensor, such as a pressure sensor, that detects atmospheric pressure. In response to the pressure sensor detecting atmospheric pressure equivalent to air pressure at sea level, the launch vehicle 104 may activate. The launch vehicle 104 launches the drone 106 to a predetermined condition (such as a predetermined altitude, which may be achieved through a detected altitude, a detected acceleration, and/or when the launch vehicle 104 runs out of fuel). At the predetermined altitude, the drone 106 transitions from a stowed state to a deployed state, in which the arms 138 and the landing legs 192 extend, the propulsion systems 140 activate, and the launch vehicle separates 104 from the drone 10 and falls back towards the surface 252. The drone 106 in the deployed state may then perform a mission and land on a landing pad 292 of the base 292 or a deck 294 of the ship 280.

The drone launch system 100 may be used with respect to various other platforms. For example, the drone launch system 100 may be launched from a weapon, such as a cannon, a howitzer, a gun, a missile launcher, and/or the like positioned on land, or on a vehicle, such as a tank, ship, aircraft, or the like. In another embodiment, the drone launch system 100 may be dropped from an aircraft. In at least one other embodiment, the drone launch system 100 may be positioned on a pallet, raft, or other such structure that is dropped onto a surface. The launch system 100 may then be activated based on a received activation signal from a remote control at a desired time.

Referring to FIGS. 1-8, the drone launch system 100 may include the launch vehicle 104 and the drone 106 stowed within the canister 102 in a stowed state. Alternatively, the drone launch system 100 may not include the launch vehicle 104. Instead, the drone 106 may be stowed within the canister 102, which may be launched from a launch system (such as a gun) or dropped from an aircraft. The drone 106 may be deployed from the canister at a predetermined altitude, for example, such as through an internal charge that detonates within the canister, and/or through the force of the launch from the launch system.

In at least one other embodiment, the canister 102 may stow multiple drones 106 and launch vehicles 104. For example, multiple drones 106 may be deployed from a single canister 102.

Figure 9:
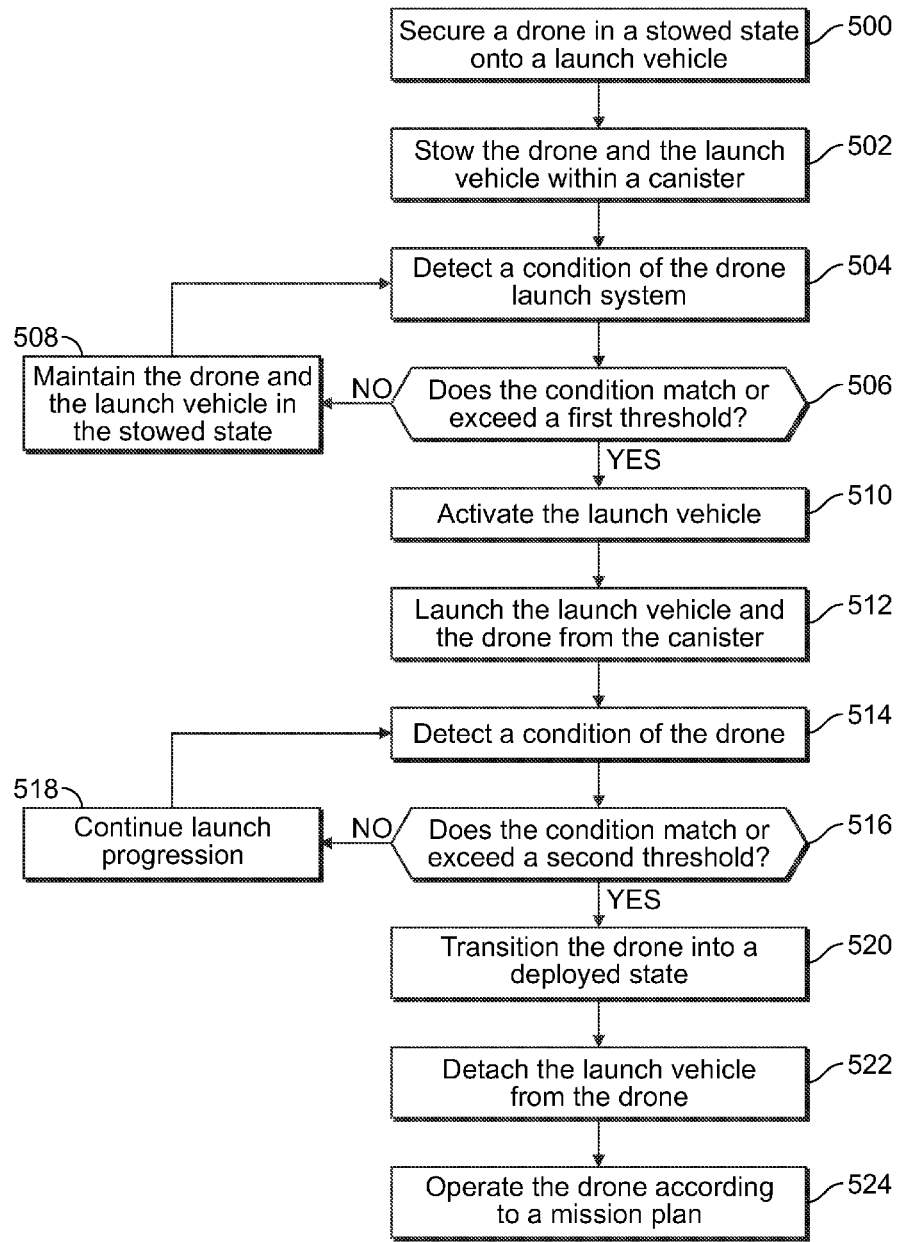
FIG. 9 illustrates a flow chart of a method of deploying a drone from a drone launch system, according to an embodiment of the present disclosure.

FIG. 9 illustrates a flow chart of a method of deploying a drone from a drone launch system, according to an embodiment of the present disclosure. At 500, a drone in a stowed state is secured onto a launch vehicle. At 502, the drone and the launch vehicle are stowed within a canister. At 504, a condition of the drone launch system is detected. The condition may be one or more of an altitude, acceleration, velocity, time from a launch event, a received activation signal, or the like. It is determined at 506 if the condition matches or exceeds a first threshold. If not, then the method proceeds to 508, in which the drone and the launch vehicle are maintained within the canister in the stowed state. The method then proceeds from 508 back to 504.

If, however, the condition does match or exceed a first threshold, the method proceeds from 506 to 510, in which the launch vehicle is activated. At 512, the activated launch vehicle launches itself and the drone from the canister. At 514, a condition of the drone is detected. The condition may be one or more of an altitude, acceleration, velocity, time from a launch event, a received activation signal, or the like. At 516, it is determined if the condition matches or exceeds a second threshold. If not, the method proceeds to 518, in which the launch progression (such as a powered ascent or a descent from an aircraft) continues. The method then proceeds from 518 back to 514.

If, however, the condition does match or exceed the second threshold, the method proceeds from 516 to 520, in which the drone is transitioned into a deployed state. At 522, the launch vehicle detaches from the drone. At 524, the drone is operated according to a mission plan.

Referring to FIGS. 1-9, embodiments of the present disclosure provide drone launch systems and methods that efficiently stow a drone within a canister before launch, thereby providing a compact drone launch package that takes up less space in confined areas. Further, embodiments of the present disclosure provide systems and methods of safely transporting drones within protective canisters. Also, embodiments of the present disclosure provide systems and methods of efficiently deploying drones on missions.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A drone launch system, comprising:
   a canister defining an internal cavity; and
   a drone positioned within the internal cavity in a stowed state, wherein the drone is configured to be ejected from the canister and transition from the stowed state into a deployed state outside of the canister, wherein the drone comprises:
     a main housing and at least one arm having at least one propulsion system, wherein the at least one arm is folded into a collapsed position in the stowed state, and wherein the at least one arm extends outwardly from the main housing in the deployed state, wherein the at least one arm comprises a fixed beam that connects to an extension beam through a hinge, wherein the extension beam is rearwardly folded in the stowed state, and wherein the extension beam moves about the hinge into an extended position in the deployed state; and
     at least one connection member that is configured to connect to and restrain the extension beam in the stowed state, wherein the connection member is configured to release the extension beam as the drone transitions from the stowed state to the deployed state.

2. The drone launch system of claim 1, wherein the canister is water-tight in a closed position in which the drone is stowed within the internal cavity.

3. The drone launch system of claim 1, wherein the canister is buoyant and configured to float on a surface of water when the drone is in the stowed state within the internal cavity.

4. The drone launch system of claim 1, wherein the drone further comprises at least one deployable landing leg, wherein the at least one deployable landing leg extends into a deployed position as the drone transitions from the stowed state to the deployed state.

5. The drone launch system of claim 1, further comprising a launch vehicle secured to the drone within the internal cavity.

6. The drone launch system of claim 5, wherein the launch vehicle comprises a plurality of fins, and wherein the canister comprises a plurality of fin guides that retain the plurality of fins when the launch vehicle is stowed within the canister.

7. The drone launch system of claim 5, wherein the launch vehicle comprises at least one blade holder configured to restrain at least a portion of a propulsion system of the drone in the stowed position.

8. The drone launch system of claim 5, wherein the launch vehicle activates to eject the launch vehicle and the drone from the internal cavity in response to detection of a condition of the drone launch system.

9. The drone launch system of claim 8, wherein the launch vehicle comprises at least one sensor that is configured to detect the condition, and wherein the condition is one of an altitude, an acceleration, a velocity, a position relative to sea level, or a time from a launch of the canister from a platform.

10. The drone launch system of claim 5, wherein the drone separates from the launch vehicle and transitions to the deployed state in response to detection of a condition of the drone.

11. The drone launch system of claim 10, wherein the drone comprises at least one sensor configured to detect the condition, and wherein the condition is one of an altitude, an acceleration, a velocity, a position relative to sea level, or a time from a launch of the launch vehicle and the drone from the canister.

12. A drone launch system, comprising:
    a canister defining an internal cavity;
    a drone positioned within the internal cavity in a stowed state, wherein the drone is configured to be ejected from the canister and transition from the stowed state into a deployed state outside of the canister, wherein the drone comprises a main housing, a drone sensor, and a plurality of arms having a plurality of propulsion systems, wherein each of the plurality of arms is folded into a collapsed position in the stowed state, and wherein the each of the plurality of arms extends outwardly from the main housing in the deployed state; and
    a launch vehicle secured to the drone within the internal cavity, wherein the launch vehicle activates to eject the launch vehicle and the drone from the internal cavity in response to detection of a first condition of the drone launch system, wherein the launch vehicle comprises a launch vehicle sensor that is configured to detect the first condition, wherein the first condition is one of a first altitude, a first acceleration, a first velocity, a first position relative to sea level, or a first time from a launch of the canister from a platform, wherein the drone separates from the launch vehicle and transitions to the deployed state in response to detection of a second condition of the drone, and wherein the drone sensor is configured to detect the second condition, wherein the second condition is one of a second altitude, a second acceleration, a second velocity, a second position relative to sea level, or a second time from a launch of the launch vehicle and the drone from the canister.

13. The drone launch system of claim 12, wherein the launch vehicle comprises a plurality of fins, and wherein the canister comprises a plurality of fin guides that retain the plurality of fins when the launch vehicle is stowed within the canister.

14. The drone launch system of claim 12, wherein the launch vehicle comprises a plurality of blade holders configured to restrain at least portions of the plurality of propulsion systems of the drone in the stowed position.

15. The drone launch system of claim 12, wherein the drone further comprises a plurality of deployable landing legs, wherein the plurality of deployable landing legs extends into a deployed position as the drone transitions from the stowed state to the deployed state.

16. The drone launch system of claim 12, wherein each of the plurality of arms comprises a fixed beam that connects to an extension beam through a hinge, wherein the extension beam is rearwardly folded in the stowed state, and wherein the extension beam swings about the hinge into an extended position in the deployed state.

17. The drone launch system of claim 16, wherein the drone comprises a plurality of connection members, wherein each of the plurality of connection members is configured to connect to and restrain a respective one of the extension beams in the stowed state, wherein each of the plurality of connection members is configured to release the respective one of the extension beams as the drone transitions from the stowed state to the deployed state.

18. A drone launch system, comprising:
a canister defining an internal cavity;
a drone positioned within the internal cavity in a stowed state, wherein the drone is configured to be ejected from the canister and transition from the stowed state into a deployed state outside of the canister; and
a launch vehicle secured to the drone within the internal cavity, wherein the launch vehicle comprises at least one blade holder configured to restrain at least a portion of a propulsion system of the drone in the stowed position.

19. A drone launch system, comprising:
a canister defining an internal cavity and including a plurality of fin guides;
a drone positioned within the internal cavity in a stowed state, wherein the drone is configured to be ejected from the canister and transition from the stowed state into a deployed state outside of the canister; and
a launch vehicle secured to the drone within the internal cavity, wherein the launch vehicle includes a fuselage that retains a propulsion system and a plurality of fins, wherein the plurality of find guides retain the plurality of fins when the launch vehicle is stowed within the canister, and wherein the propulsion system is configured to activate to eject the drone and the launch vehicle out of the canister.

20. The drone launch system of claim 19, wherein the drone comprises:
at least one arm having at least one propulsion system, wherein the at least one arm comprises a fixed beam that connects to an extension beam through a hinge; and
at least one connection member that is configured to connect to and restrain the extension beam in the stowed state, wherein the connection member is configured to release the extension beam as the drone transitions from the stowed state to the deployed state.

21. The drone launch system of claim 19, wherein the launch vehicle comprises at least one blade holder configured to restrain at least a portion of a propulsion system of the drone in the stowed position.

22. A drone launch system, comprising:
a canister defining an internal cavity;
a drone positioned within the internal cavity in a stowed state, wherein the drone is configured to be ejected from the canister and transition from the stowed state into a deployed state outside of the canister; and
a launch vehicle secured to the drone within the internal cavity, wherein the launch vehicle includes a fuselage that retains a propulsion system and at least one blade holder configured to restrain at least a portion of a propulsion system of the drone in the stowed position, wherein the propulsion system of the launch vehicle is configured to activate to eject the drone and the launch vehicle out of the canister.

23. The drone launch system of claim 22, wherein the drone comprises:
at least one arm having at least one propulsion system, wherein the at least one arm comprises a fixed beam that connects to an extension beam through a hinge; and
at least one connection member that is configured to connect to and restrain the extension beam in the stowed state, wherein the connection member is configured to release the extension beam as the drone transitions from the stowed state to the deployed state.

* * * * *